United States Patent [19]

Porel et al.

[11] Patent Number: 4,597,483

[45] Date of Patent: Jul. 1, 1986

[54] HYDROSTATIC CLUTCH

[75] Inventors: Louis-Claude Porel, Rambervillers, France; Ivan Cyphelly, Bad Grund, Fed. Rep. of Germany

[73] Assignees: Hydro Rene Allee Rene Leduc Azerailles, Azgrailles, France; Glyco Antriebs Technick GmbH, Wiesbaden, Fed. Rep. of Germany

[21] Appl. No.: 445,027

[22] Filed: Nov. 29, 1982

[30] Foreign Application Priority Data

Nov. 30, 1981 [FR] France .................. 81 22468

[51] Int. Cl.$^4$ ............................................. F16D 31/02
[52] U.S. Cl. .......................................... 192/59; 192/60; 417/273
[58] Field of Search ................... 192/59, 60; 188/295, 188/305, 311; 417/273, 435

[56] References Cited

U.S. PATENT DOCUMENTS

| 2,408,574 | 10/1946 | Morris | 192/59 |
| 2,511,518 | 6/1950 | Stephens | 192/60 |
| 3,221,564 | 12/1965 | Raymond | 74/569 |
| 3,488,980 | 1/1970 | Burrough | 192/59 |
| 3,873,240 | 3/1975 | Leduc et al. | 417/222 |
| 4,451,094 | 5/1984 | Martin | 188/295 |
| 4,486,152 | 12/1984 | Porel | 417/270 |

FOREIGN PATENT DOCUMENTS 2449210 2/1979 France .

Primary Examiner—Rodney H. Bonck
Assistant Examiner—Alan G. Towner
Attorney, Agent, or Firm—Darby & Darby

[57] ABSTRACT

A hydrostatic clutch, includes coaxial driving and driven rotative members, so that when in the clutched condition rotative power is transferred from the driving to driven member. The clutch includes a plurality of pistons bearing upon an inclined cam, and move in a reciprocating motion when the cam which is coupled to either the driven or driving shaft, rotates. A second cam also driven by the driven or driving members, is adopted to be disposed with respect to the mobile member which drives it, into two positions offset by 180°. The second cam acting upon a suction valve controlling the intake of hydraulic fluid, via opposing springs. At least one double stage or delivery valve is carried by the same mobile driving or driven member. A fixed casing is connected to the mobile member carrying the delivery valve or valves, through a rotating seal. The fixed casing is connected via a plurality of hydraulic channels to various hydraulic fluid regulation member.

16 Claims, 3 Drawing Figures

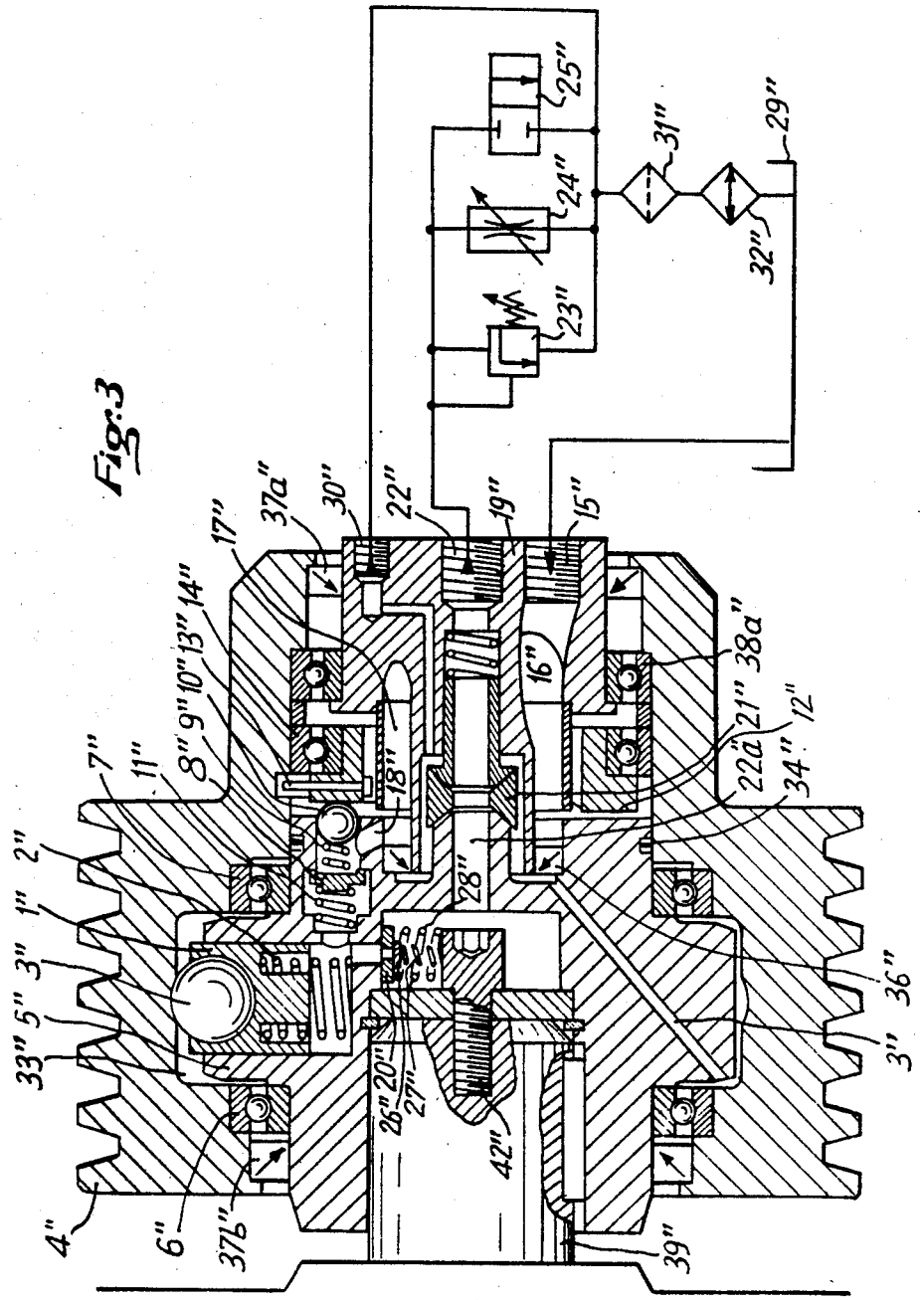

HYDROSTATIC CLUTCH

FIELD AND BACKGROUND OF THE INVENTION

The object of this invention is a hydrostatic clutch.

It is known how to provide a hydrostatic clutch by means of a hydraulic pump the flow capacity of which is made to vary if, for example, the pump casing is connected to the driven member while the pump shaft is the driving member, and it will be appreciated that when the pump flow is zero, the pump shaft and its casing are hydraulically locked, and they rotate substantially at the same speed; while when the pump flow is maximum, the shaft rotates and the casing is stationary. Many hydrostatic clutches have been realized by application of this general principle, but for so doing, the pump used has to meet the following imperative requirements:

(a) When the driving member and the driven member are connected to each other (clutched condition), the internal leakage of the pump, the pumping elements of which are made stationary or substantially stationary by a hydraulic locking, must not be resucked by the pump, since this would cause a rapid warm-up of the liquid leading to the destruction of the pump.

(b) The pump has to be self-starting and it must remain in operation even at the highest pumping conditions which are considered.

(c) The pump has to be operable in the two rotation directions.

(d) In its unclutched condition, the pump should present a negligible residual torque.

For the reason of these various imperative requirements, it has not been hitherto possible to provide a hydraulic clutch by means of a piston pump, the pistons being either radial or axial, while this type of pump is that allowing the smallest internal leakage.

OBJECTS AND SUMMARY OF THE INVENTION

The object of the invention is a hydrostatic clutch provided for a piston pump.

The hydrostatic clutch according to the present invention is made of: a plurality of pumping pistons arranged between a driving rotative member and a driven rotative member, coaxial, said pistons being imparted, when said members are rotating one relative to the other, with a reciprocating pumping motion caused by a surface operating as a cam carried by one or the other of said driving and driven members; a second surface operating as a cam driven by that of the two driven or driving members which carries the first surface operating as a cam and adapted for being disposed, with respect to the member which drives it, into two positions off-set by 180° one relative to the other, said second surface operating as a cam acting on the suction valves carried by one or the other of the mobile members, driving or driven, in a direction opposite that of their closing, through the agency of springs; at least one double stage delivery valve carried by the same mobile driving or driven member; a fixed casing connected to the mobile member carrying the delivery valve or valves, through the agency of a rotating seal, said fixed casing being connected via a plurality of hydraulic channels to the various regulation members.

BRIEF DESCRIPTION OF THE DRAWINGS

Embodiments of the invention are shown, by way of example, in the accompanying drawings wherein:

FIG. 3 is an axial sectional view of a third embodiment of a clutch according to the invention, in which the casing is rotative and the pistons radial.

DETAILED DESCRIPTION OF THE INVENTION

Figure 1:
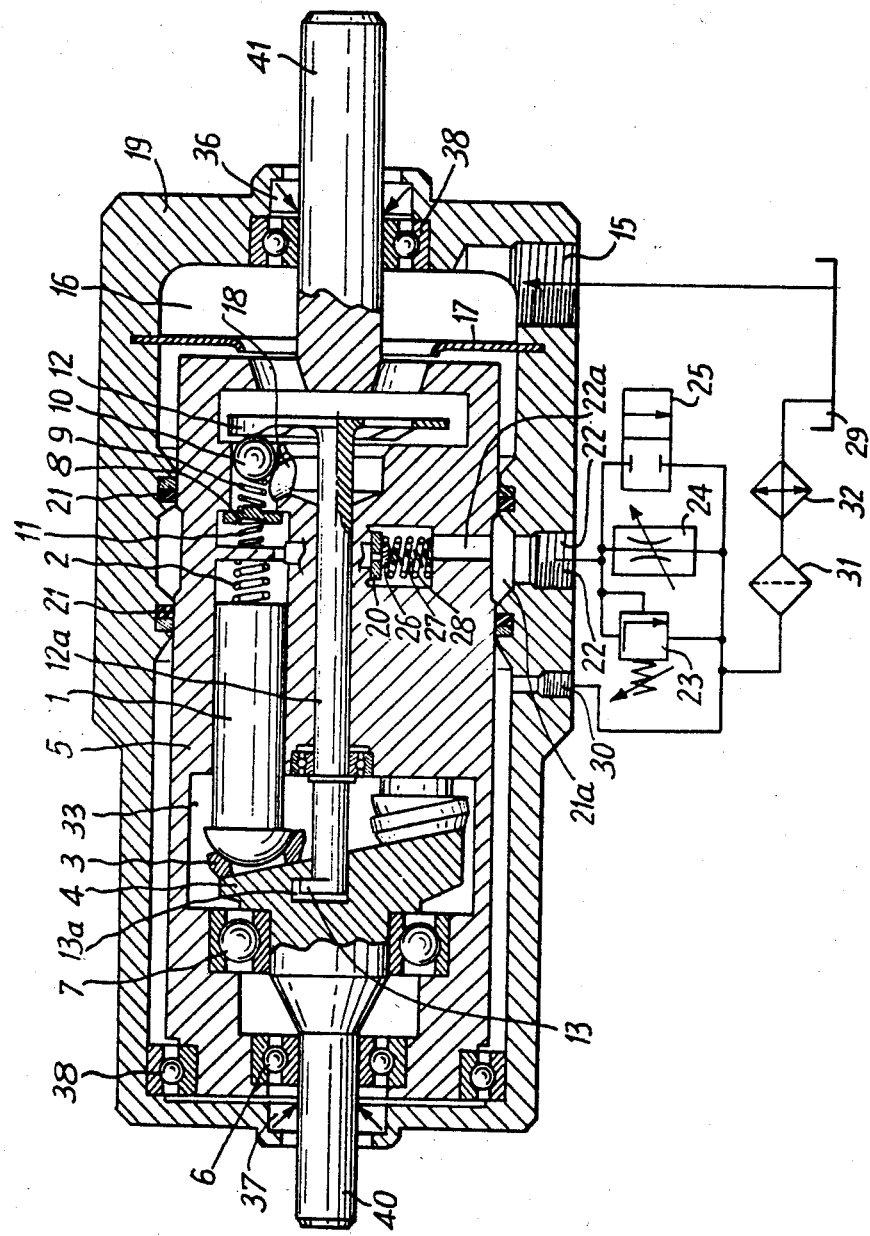
FIG. 1 is an axial sectional view of a first embodiment of a clutch according to the invention, in which the input and output members are coaxial shafts.

In the following description, the members fulfilling the same function are referenced by the same numbers, independently of the differences in their topologic arrangement according to the radial or axial versions.

The volume core of the hydrostatic clutches concerned by the present invention is a set of pistons 1, 1', 1" sliding in a cylinder block 5, 5', 5" and applied by means of springs 2, 2', 2" either through pads 3, interposed against an oblique plate 4, 4', or through balls 3" interposed against a cam 4" so as to impart to pistons 1, 1', 1" a reciprocating motion with respect to the cylinder block 5, 5', 5" as soon as there is a relative rotation between the latter and the oblique plate 4, 4' or the cam 4" respectively. The bearings 6, 6', 6" and 7, 7', 7" are used for positioning the oblique plate 4, 4' or cam 4" relative to the cylinder block 5, 5', 5". The opening of the suction valves 8, 8', 8" maintained in a closed position by springs 11, 11', 11" is assisted by springs 9, 9', 9" bearing on the balls 10, 10', 10", the valves overriding the closing springs 11, 11', 11" as soon as the cam 12, 12', 12" carrying an indexing finger 13, 13', 13" causes the lifting up of valves 8, 8', 8" except if a residual pressure in the cylinder concerned maintains the closed condition of the valves.

In order to provide synchronization of the suction valves lifting curve with respect to the dead points when there is a reversal of the relative rotation motions, cam 12, 12', 12" has to have the possibility of rotating about 180° in the case of mechanisms effecting one stroke per turn and per piston, such as the oblique plate 4, 4', or about 90° for a cam 4" allowing two strokes per turn; to this end, cam 12, 12', 12" is in abutment against a bearing 14, 14', 14" in order to provide an instantaneous reversal of the synchronization delimited by the indexing fingers 13, 13', 13" and induced by the friction of balls 10, 10', 10".

In the case of FIG. 1, cam 12 is carried by a rod at the opposite end of which is fixed an indexing finger 13 which is movable in a groove provided in the oblique plate, so as to move from one to the other of two positions defined by the groove ends, said positions being off-set by 180°.

Figure 2:
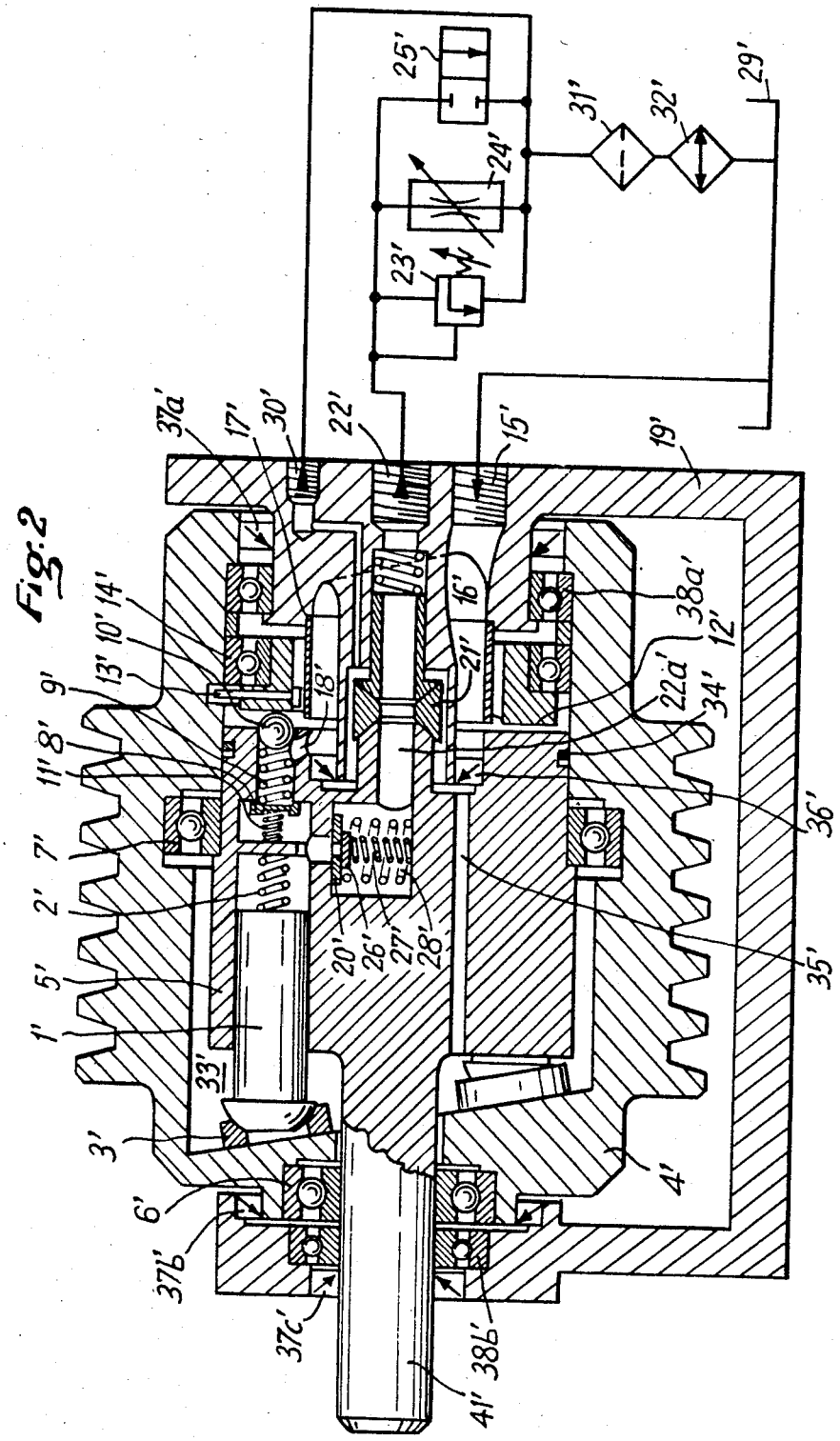
FIG. 2 is an axial sectional view of a second embodiment of a clutch according to the invention, in which the casing is rotative, the pistons being axial.

In the case of FIG. 2 and 3, cam 12', 12" carries an indexing finger 13', 13" which, in a similar way, moves between the two ends of a groove provided in casing 4', 4" carrying the surface operating as a cam which actuates pistons 1', 1".

The suction valves are fed from tank 29, 29', 29" via suction ports 15, 15', 15" in the fixed casing 19, 19', 19" toward the suction chamber 16, 16', 16", bordered by screen 17, 17', 17" which conveys the fluid toward the openings 18, 18', 18" which emerge upstream of the abovementioned valves.

In order that the self-starting be possible, it is necessary, when the pistons are only delivering air, that the lifting of the delivery valves be provided by the air delivered, while when they deliver liquid at a high pressure, that their closing be very rapid. Therefore, the closing return springs have to be simultaneously energetic and weak. This contradictory imperative requirement is solved by disposing a two stage valve, such as valves 20, 20', 20", which comprise a main valve returned by an energetic spring 28, 28', 28", said main valve being formed with an opening which is in turn closed by a second valve 26, 26', 26", returned by a weak spring 27, 27', 27".

The liquid which is delivered flows through valves 20, 20', 20" and reaches the outlet port 22, 22', 22" formed in the fixed casing 19, 19', 19" by means of a rotating seal which is either a shaft transfer seal 21, or a rotating union 21', 21". The outlet port 22, 22', 22" is in turn connected to the control and regulation hydraulic devices such as a pressure limiting device 23, 23', 23", a flow regulator 24, 24', 24", a cock 25, 25', 25", etc. In practice it is impossible to manufacture a high pressure rotating hydraulic apparatus that is totally leak proof. Consequently, there is always a small amount of hydraulic fluid which leaks from the apparatus. This leaked fluid has been subjected to a high pressure and therefore its temperature has also increased. It is imperative that this liquid not be directly repumped into the pumps since then its temperature would be raised again, and again, until complete destruction of the pump ensued. It must be emphasized that when a hydraulic clutch of the hydraulic pump type is in the driving condition, the pump does not pump anymore hydraulic fluid and in consequence there is no circulation during which the liquid may be cooled. It is therefore important to remove the leakage flow from the pump and cool it.

The leakage flowing through the clearance of pistons 1, 1', 1" in their bores in the cylinder block 5, 5', 5" and warmed up by the pressure drop and the frictions is brought back to tank 29, 29', 29" through the leakage port 30, 30', 30" connecting filter 31, 31', 31" to the heat exchanger 32, 32', 32" downstream of the control and regulation means.

In the first embodiment (FIG. 1), the leakage port 30 is placed between the neutral area 33 and seal 21 so that the leakage caused by the clearance of pistons 1 in their bores, formed in body 5, and flowing in the neutral area 33 is discharged by port 30. In the second and third embodiments, the neutral area 33', 33" is connected by a channel 35', 35" in the area limited by the lip seal 36', 36", said area being in turn connected to the leakage discharge port 30', 30". Moreover, in both cases, the seal 34', 34" has to be interposed between the two mobile members 4', 4" and 5', 5".

It is to be noted that the leakage of the rotative union 21', 21" is also drained toward union 30', 30" by the same device, avoiding thereby a rapid destruction of the clutch through local warming up during an accidental increase of the leakage of said rotative union.

Screen 17, 17', 17" protects the liquid flow by suction by the rotative parts: should the sucked liquid be driven in rotation, this would cause either swirls, or through the centrifugal force, a critical increase of the load loss possibly reaching cavitation.

In addition to auxiliairy elements such as shaft seals 37a, 37a', 37a", 37b, 37b', 37b" or 37c', bearings 38a, 38a', 38a" and 38b, 38b', positioning the fixed body with respect to the parts in rotation, it should be noted that for the clutch of FIG. 3, the assembly bears on a shaft 39" fitted into the rotative member 15" carrying the cylinders, whereby said rotating member can be indifferently the input or output power take-off, just as the two shaft stubs 40, 41 of the fixed casing model (FIG. 1) or shaft 41' and pulley 4' (FIG. 2) are not sensitive to the direction of the energy flux.

The operation of the devices just described will be explained hereafter:

In the case of FIG. 1, the two driving and/or driven members are each connected to a shaft 40 or 41, said both shafts being coaxial. Shaft 40 is rigidly connected to an oblique plate 4 which forms the first surface operating as a cam; shaft 41 is rigidly connected to a cylindrical body 5 called barrel, comprising a plurality of bores, parallel to each other and to the axis of shafts 40 and 41. In said bores are placed pistons 1 biased by springs 2 and bearing via pads 3 against the inclined face of the oblique plate 4. The shaft 40 and the oblique plate 4 are supported by bearings 6 and 7 carried by barrel 5. At the rear of the piston bores are mounted sucking valves 8. Each valve 8 is biased by a spring 11. On the other face of each valve 8 is arranged a supporting spring 9 the other end of which is bearing against a ball 10 sitting on the surface of a circular cam 12. The circular cam 12 is carried by a rod 12a coaxial to shafts 40 and 41. Said rod 12a is driven in rotation by shaft 40. To this effect, it comprises a finger 13 moving inside a groove 13a. Said groove 13a has two end walls arranged such that finger 13 can occupy two positions off-set one relative to the other by 180°, according to the rotation direction of shaft 40. Cam 12 acts upon each valve 8 via the springs 9 and in opposition to the return springs 11 of said valves. Said arrangement which is described in U.S. patent application Ser. No., 209,220, filed Nov. 21, 1980, now U.S. Pat. No. 4,486,152, permits proper filling of the pistons, and opening of the suction valves, when the residual pressure in the dead chamber of each piston bore has fallen below a predetermined value. It also permits the reversal of the rotation direction. The chambers situated at the rear of the pistons are connected to a two stage delivery valve. Said valve comprises a main valve 20 biased by a spring 28; the main valve 20 is formed in its center with a hole closed by a second valve 26 biased by a spring 27. The spring 28 is strongly calibrated and the spring 27 weakly calibrated. This arrangement disclosed in French Pat. No. 79.03708 allows the self-starting when the chambers situated at the rear of the pistons are filled with air: the compressed air pressure is not sufficient for lifting valve 20, but it lifts valve 26 and once the air is discharged and the delivery channel is filled with liquid, the auxiliary valve 26 plays no more role. The delivery valve emerges via a channel 22a in the circular groove 21a delimited by the two cylindrical edges of a rotative seal 21 in two portions. In groove 21a emerges the port 22 carried by casing 19 which encloses the two mobile members 4 and 5.

In casing 19 is formed a feeding port 15 which emerges into a chamber 16 inside casing 19, and into which protrudes the rear portion of barrel 5 which comprises the feeding ports 18 communicating with the suction valves 8. Preferably, a screen 17, placed in chamber 16, guides the fluid toward openings 18 while avoiding swirls. Casing 19 carries the shafts 40 and 41 via bearings 38 associated with seals 36 and 37.

Casing 19 carries also, in addition to the delivery port 22, a drainage port 30 the object of which is to discharge the piston leakage from chamber 33 inside which moves the oblique plate 4.

The feeding port 15 is connected to tank 29; the delivery port 22 is connected to the control and regulation members formed for example by a pressure limiting device 23, a flow regulator 24, a cock 25. Said members are arranged in parallel and open into a filter 31 and a heat exchanger 32, in series, toward tank 29.

The draining port 30 is connected to the circuit upstream of the control members 23, 24, 25 and upstream of filter 30.

Assuming for example that shaft 40 is connected to a motor and shaft 41 to a machine of some sort which has to be driven by said motor via a hydrostatic clutch, the shaft 40, which is the driving member, drives the oblique plate 4 in rotation. If the arrangement of the control members 23, 24, 25 is such that the hydraulic fluid can freely circulate, the motion of the oblique plate 4 drives the pistons 1, the liquid arriving in chambers 16 via port 15 being sucked through valves 8, then delivered through the double stage valve 20, 26 and exiting via port 22, the device is in an unclutched condition. If the disposition of the control members is such that no flow is possible through port 22, the pistons 1 are no more in a position to deliver the liquid which is in their bores, and the driving member, viz. the oblique plate 4, is hydraulically locked to barrel 5 which is therefore driven in rotation; the device is then in a clutched condition. It will be appreciated that between said two clutched and unclutched conditions, it is possible, by adjusting the flow exiting from port 22, to obtain a more or less important sliding displacement, which is determined at will, between the driving member and the driven member.

FIG. 2 shows that shaft 41' is rigidly connected to barrel 5', comprising bores through which move the pistons 1'; while the other mobile member is a casing 4' carrying the cam surface, viz. the oblique plate. Said housing-shaped mobile member is formed with a plurality of pulley grooves. The inlet 8' or delivering 20'-26' valves are identical to the preceding case. The second cam surface 12' is carried by a bearing 14'; it comprises an indexing finger 13' movable in a groove formed in the mass of the mobile member 4', said groove comprising two end walls against either one of them abuts the indexing finger 13'. Said two ends of the groove are disposed such that the two possible positions of finger 13' are off-set by 180°. In this case, cam 12' is therefore driven by the casing 4'. Casing 9 encloses partly the two rotating members 4' and 5'. It carries shaft 41' via a bearing 38b' and casing 4' via a bearing 38a'; while casing 4' is rotatably mounted on shaft 41' via two bearings 6' and 7'. The tightness between barrel 5' and casing 4' is provided by a circular seal 34'. The tight junction on the delivery side, via duct 22a' which is integral with member 5', is provided by a rotating seal 21'.

Said rotating seal is formed by a biconical pin, on the two conical faces of which come to bear, on the one hand a head shaped as a portion of a sphere provided at the end of channel 22a' and on the other hand the head shaped as a portion of a sphere of a hollow piston biased by a spring. Such an arrangement which is disclosed in French Pat. No. 69.13171 and U.S. Pat. No. 3,873,240 provides an excellent tight connection between a fixed part and a mobile part.

The operation of the device described in FIG. 2 is identical to that of the device described in FIG. 1. In this case however, the internal leakage likely to appear in chamber 33' is conveyed back through a channel 35' from the front face of the barrel to its rear face, viz. from chamber 33' to the chamber connected with port 30'.

One sees in FIG. 3 that member 5" which carries the bores of pistons 1" is keyed onto a shaft 39". In this embodiment, the bores of piston 1" are placed radially, that is perpendicularly to the axis of shaft 39". The pistons 1" are biased by springs 2" and bear via balls 3" against a surface acting as a cam which is situated inside the second rotative member 4". Said surface acting as a cam is a kind of circular groove excentered with respect to the axis of member 5". Therefore, one sees that the whole rotary movement of one of members 4" or 5" relative to the other causes a reciprocating motion of pistons 1". The feeding 8" and delivering 20"-26" valves are identical to those described in the two preceding cases; the second surface 12" acting as a cam is identical to that of FIG. 2, as well as seal 21". The mobile member 4" carries pulley grooves, as mobile member 4'. In this case, the fixed casing 19' is rotatably mounted on the mobile member 4", via a bearing 38a" and is placed at the end of said mobile member 4" which is opposite shaft 39".

We claim:

1. A hydrostatic clutch comprising:
a self-starting, reversible, hydrostatic pump including a casing, and having a driven shaft coupled to said casing for providing output rotational motion therefrom, a driving shaft for receiving input rotational motion, a cam coupled to receive rotational motion from said driving shaft, a plurality of pistons bearing on said cam and being pumped by the rotation thereof, flow rate regulation means, and a tank for containing hydraulic fluid, said hydraulic fluid being drawn from said tank and returned thereto via said flow rate regulation means, said flow rate regulation means regulating said flow rate from its maximum value for which the relative motion of said driving shaft with respect to said driven shaft is maximum, to a zero value for which the relative motion of said driven shaft is zero, wherein;
said pump includes a suction side for receiving hydraulic fluid from said tank;
said clutch including rotative seals for preventing overflow of leakages to said suction side disposed between regions where said leakages appear and said suction side; and
a draining port, provided for returning directly said leakage fluid to said tank.

2. A hydrostatic clutch according to claim 1 further comprising heat exchanger means coupled between the said draining port and said tank for cooling said hydraulic fluid.

3. The hydrostatic clutch according to claim 1, further comprising a suction channel, a delivery channel supporting flow rate regulation means and a draining channel for connecting said casing to said tank; a cylinder block mounted so as to rotate freely inside said casing by bearings, said cylinder block having bores through and supporting a plurality of pistons adapted for moving in said bores, said cylinder block being rigidly connected to a first driving or to said driven shaft; an oblique plate mounted so as to rotate freely on bearings inside said cylinder block, said oblique plate being rigidly connected to a second driven or driving shaft, any relative motion of one with respect to the other of said driving or driven shafts causing a displacement of pistons in their bores; said rotative seals being disposed between said fixed casing and said cylinder block so as to define three regions: a suction region in communication with said suction channel; a pressure region in communication with the delivery channel; a leakage recovery region in communication with said draining channel, said leakage recovery region being sealed both from said suction region and from said pressure region.

4. The hydrostatic clutch according to claim 3, wherein said pressure region is between said suction region and said leakage recovery region.

5. The hydrostatic clutch according to claim 4, wherein: said suction region is between one of said rotative seals and a lip seal surrounding said first shaft, said rotative seal being subjected on one of its faces to delivery pressure, said lip seal being only subjected to the supply pressure; the pressure region being between said two rotative seals disposed between said barrel and said fixed casing, said two rotative seals being subjected to the delivery pressure and arranged symmetrically; the leakage recovery region being provided between one of said two rotative seals and a low pressure shaft seal surrounding said second shaft.

6. The hydrostatic clutch according to claim 5, wherein each bore in which said pistons move includes a suction valve of two opposing springs acting on said suction valve, one of said springs acting on said valve to close it, the other spring acting on said valve to open it, said spring being compressed at an end opposite said valve by a cam rotatably connected to said second shaft.

7. The hydrostatic clutch according to claim 6, further including said rod coaxial to said second shaft and supporting said cam, said rod being rotatably connected to said second shaft via an indexing finger which can occupy with respect to said second shaft two positions off-set one relative to the other by 180°.

8. The hydrostatic clutch according to claim 1 wherein said fixed casing is connected to said tank by said suction channel, by a delivery channel supporting said flow rate regulation means, and by a draining channel; a rotative casing (4') being mounted so as to rotate freely on said fixed casing by bearings and forming the first driving or driven member, said rotative casing comprising an inclined face; a barrel mounted so as to rotate freely inside said rotative casing by bearings, wherein said plurality of pistons are supported by said barrel said pistons being moveable in said cylinder bores and are rigidly connected to a shaft forming the second driven or driving member, the relative motion of the two members, which are mobile one with respect to the other, causing a displacement of said pistons; a high pressure rotative seal providing a direct communication between said delivery channel formed in the barrel and the delivery channel, while a low pressure seal provides the tight separation between a feeding region in which opens the feeding channel and a leakage recovery region connected to the draining channel.

9. The hydrostatic clutch according to claim 8, in which the leakage recovery region is separated from said feeding region by a low pressure rotative seal and from said delivery region by a high pressure rotative seal.

10. The hydrostatic clutch according to claim 9, wherein said bore in which moves said pistons includes a suction valve subjected to the action of first and second opposing springs, said first spring acting on a valve to close it, the other spring acting on said valve to open it, latter being supported at its other end by a cam rotatably connected to the first mobile member, formed by said mobile casing.

11. The hydrostatic clutch according to claim 10, wherein said cam is supported by said rotating casing on which it is rotatably mounted by a bearing and is rotatably connected to said rotative casing forming the first mobile member by a finger which can occupy two positions at 180° with respect to said rotative casing.

12. A hydrostatic clutch comprising:
a self-starting reversible hydrostatic pump including a casing and having a first mobile member coupled to said casing for providing output rotational motion therefrom, a second mobile member for receiving input rotational motion, a cam coupled to receive rotational motion from said driving shaft, a plurality of pistons bearing on said cam and being pumped by the rotation thereof, flow rate regulation means, and a tank for maintaining hydraulic fluid, said hydraulic fluid being drawn from said tank and returned thereto via said flow rate regulation means, said flow rate regulation means regulating said flow rate from its maximum value for which the relative motion of said second mobile member with respect to said first mobile member is maximum, to a zero value for which the relative motion of said first mobile member is zero, wherein;
said pump includes a suction side for receiving hydraulic fluid from said tank;
said clutch includes rotative seals for preventing overflow of leakages to said suction side disposed between regions where said leakages appear and said suction side;
a draining port, provided for returning said liquid fluid directly to said tank;
wherein said clutch is formed by a delivery channel supporting said regulation means and by a draining channel wherein said casing is connected to said tank by a suction channel;
said second driving or driven mobile member surrounding said casing and mounted so as to rotate freely on the later by a bearing and comprising a surface forming a cam so as to act on said pistons;
said first driving or driven mobile member freely mounted inside the first opposite the said casing, said first mobile member supporting said plurality of pistons which can move in bores when said two mobile members affect a motion relative to one another; and
a high pressure rotative seal providing a direct communication between the supply of said pistons and the supply channel, while a low pressure seal provides tight separation between a feeding region and a leak of recovery region connected to said draining channel.

13. The hydrostatic clutch according to claim 12, wherein said leakage recovery region is separated from said supply region by a low pressure rotative seal and from said delivery region by a high pressure rotative seal.

14. The hydrostatic clutch according to claim 12, wherein each bore in which moves said piston is provided with a suction valve subjected to the action of first and second antagonistic springs, said first of spring acting on said suction valve to close it, said second spring acting on said suction valve to open it, said second springs, bearing on a cam at its other end, said cam being rotatably connected to said first mobile member.

15. The hydrostatic clutch according to claim 1 wherein said cam is carried by said driven shaft by means of a bearing and is rotatably connected to said driven shaft via a finger which can occupy two positions off-set one relative to the other by 90°.

16. A clutch according to any one of claims 1 through 11 and 3 through 15 comprising a screen protruding into said casing for guiding flow of said hydraulic fluid adjacent to rotating parts thereof for providing protection thereof.

* * * * *